United States Patent [19]

Witalka et al.

[11] 4,437,157

[45] Mar. 13, 1984

[54] DYNAMIC SUBCHANNEL ALLOCATION

[75] Inventors: Jerome J. Witalka, Minneapolis; Duane G. Kurth, Anoka; David J. Baber, Shoreview, all of Minn.

[73] Assignee: Sperry Corporation, New York, N.Y.

[21] Appl. No.: 255,585

[22] Filed: Apr. 20, 1981

Related U.S. Application Data

[63] Continuation of Ser. No. 926,483, Jul. 20, 1978.

[51] Int. Cl.³ ............................ G06F 3/00; G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,936,803 | 2/1976 | Katzman et al. | 364/200 |
| 4,004,277 | 1/1977 | Gavril | 364/200 |
| 4,056,843 | 11/1977 | Bishop et al. | 364/200 |
| 4,096,570 | 6/1978 | Ishibashi et al. | 364/200 |

OTHER PUBLICATIONS

IBM 370 Principles of Operation/Systems, published by IBM Inc. Oct. 1981. Chapter 12 Input/Output Operations.

Primary Examiner—Gary Chin
Assistant Examiner—John G. Mills
Attorney, Agent, or Firm—William C. Fuess; Kenneth T. Grace; Marshall M. Truex

[57] ABSTRACT

An apparatus for and a method of Dynamic Subchannel Allocation permitting easily field modifiable assignment of Input/Output (I/O) subchannels to I/O channels. Many present day medium-to-large scale computers have an I/O unit(s) with a fixed number of I/O ports or I/O channels for the transmission of information between the computer and peripheral devices. Improvements to these I/O channels, now common in the art, permit multiple peripheral devices to be coupled to the computer through a single I/O channel. Each of these multiple peripheral devices may be said to communicate through an I/O subchannel. A given I/O subchannel designation logically specifies the hardware within the shared I/O channel that is dedicated to communication with the corresponding one of the multiple peripheral devices coupled to that shared I/O channel. The present invention is an improvement which provides for allocation of I/O subchannels to I/O channels in the field rather than at time of manufacture. A random access memory (RAM) is employed which provides the correlation between each I/O subchannel and the I/O channel to which it has been allocated. The RAM is called the Channel Descriptor Stack (CDS). The CDS may be loaded using a variety of techniques. In the preferred embodiment, the CDS is loaded via a specialized processor, called a system support processor (SSP), which also performs those tasks normally associated with system control (e.g., system reconfiguration, interface to the system operator, casualty recovery, etc.).

2 Claims, 10 Drawing Figures

DYNAMIC SUBCHANNEL ALLOCATION

This is a continuation, of application Ser. No. 926,483, filed July 20, 1978.

BACKGROUND OF THE INVENTION

The present invention relates generally to digital data processing equipment and more specifically to an improvement to computer input/output (I/O) hardware.

A major innovation in computer I/O art was the implementation of asynchronous, buffered I/O transfers. This capability permits multiple byte and word I/O transfers to occur asynchronously to and without intervention by the computer programs being executed. It is recommended that the reader review the operation of asynchronous, buffered I/O transfers as taught by R. L. Burkholder, et al, in U.S. Pat. No. 3,251,040.

A second major innovation was the use of a single I/O channel to communicate with multiple peripheral devices. Though many techniques have been implemented to accomplish this, the technique most often referred to herein is called Externally Specified Indexing (ESI). ESI permits multiple peripheral device usage of a single I/O channel employing asynchronous, buffered I/O transfers by maintaining multiple buffer control words (BCW's). Each one of the multiple peripheral devices on a single I/O channel has one dedicated BCW to maintain the status of and control the I/O transfers with that one of the multiple peripheral devices. Each one of the multiple peripheral devices transfers an index uniquely identifying itself to enable the computer to select the corresponing BCW to properly control each data transfer. For a detailed description of ESI operation, the reader is urged to review the technique as taught by C. W. Ehrman, et al, in U.S. Pat. No. 3,243,781.

ESI as taught by the Ehrman Patent utilizes BCW's stored in the computer's main memory. This provides each I/O channel with storage space for as many BCW's as needed. Storing BCW'in main memory has the disadvantage of requiring a relatively slow main memory reference to access a BCW, however. Therefore, as componently advanced, ESI was improved by storing BCW's in relatively small but fast random access memory (RAM) of semiconductor construction, called ICU General Registers (IGR). Each individual addressable location within the IGR is dedicated to storage of the BCW for that one peripheral device transferring the corresponding index uniquely identifying it. A single addressable location of the IGR, along with the other hardware unique to communication with a single peripheral device is called an I/O subchannel. Because of the cost of the hardware, the total number of I/O subchannels tends to be limited. Therefore, the total number of peripheral devices that may be connected in the ESI mode is limited to some number thought to provide sufficient flexibility and yet be economically feasible. Furthermore, prior systems have allocated a fixed number of I/O subchannels to each I/O channel employing the ESI mode. This allocation method is easily accomplished. However, maximum flexibility is not achieved because each I/O channel is limited in total I/O transfer bandwidth as well as number of I/O subchannels. The result for many configurations is that some I/O channels are I/O transfer bandwidth limited without utilizing all available I/O subchannels whereas other I/O channels are limited by the number of I/O subchannels available while remaining within the total I/O bandwidth of the I/O channel. This situation may make the number of usable I/O subchannels less than the number physically present in the hardware.

The present invention overcomes this deficiency permitting flexibility in the allocation of I/O subchannels to I/O channels.

SUMMARY OF THE INVENTION

A second random access memory (RAM) is used to allocate each I/O subchannel to an I/O channel. The second RAM, called the Channel Descriptor Stack (CDS), contains one addressable location for each I/O subchannel. Each addressable location has the capacity for storing the information required to uniquely identify the I/O channel to which the corresponding I/O subchannel is allocated. The CDS is loaded to correspond to the I/O configuration desired. In the preferred embodiment, the CDS is loaded by the system support processor (SSP). The SSP is a general purpose stored program digital computer that is programmed to provide the system initialization, monitoring, reconfiguration, and control functions normally associated with the operator's control console. Loading of the CDS by the SSP establishes the allocation of each I/O subchannel to the desired I/O channel. The CDS is loaded as part of system initialization and for each I/O subchannel reconfiguration desired.

The CDS is accessed to determine which I/O channel is to be activated upon initiation of a buffered I/O transfer over a given I/O subchannel. Servicing of the individual data requests from a given peripheral (see Burkholder, et al, and Ehrman, et al) arrive via the hardware of the I/O channel to which the corresponding I/O subchannel has been allocated. Therefore, the CDS need not be accessed to service the individual data requests, but need only be accessed to initiate a buffered I/O transfer. In the preferred embodiment, the CDS also contains an I/O subchannel status indication, called MODE.

DETAILED DESCRIPTION OF THE PREFERRED EMBODIMENT

Figure 1:
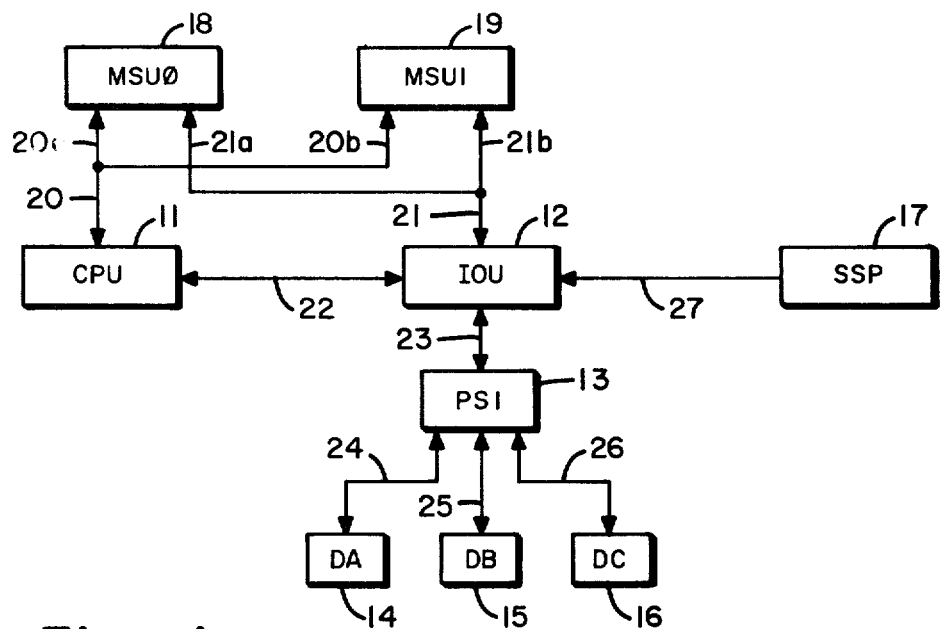
FIG. 1 shows the general configuration of a computer containing one Input/Output Unit, IOU 12, and multiple peripheral devices.

The present invention is incorporated into a computer represented in FIG. 1. The computer depicted has a Central Processor Unit 11, CPU 11, which performs the majority of arithmetic computations. CPU 11 accesses instructions and data from Memory Storage Unit 0 18, MSU0 18, and Memory Storage Unit 1 19, MSU1 19, via bi-directional cables 20a and 20b. The interface between the computer and external devices is through Input/Output Unit, IOU 12, which communicates with CPU 11 via cable 22 for exchange of control and status information and which communicates with MSU0 18 and MSU1 19 via cables 21a and 21b.

System Support Processor 17, SSP 17, is a general purpose, stored program digital computer which is programmed to perform the control and monitoring functions associated with operator interface and system control. FIG. 1 shows SSP 17 coupled to IOU 12 via cable 27, which is important to the present invention. Other cables, not shown, couple SSP 17 to other elements within the computer. During system initialization of the computer, SSP 17 executes a program stored within its internal memory which causes SSP 17 to transfer the appropriate I/O subchannel allocation information to IOU 12 via cable 27. The format and timing of the I/O subchannel allocation information is discussed in detail below.

IOU 12 communicates with devices external to the computer via one or more cables. One such cable, along with the hardware within IOU 12 to support I/O transfers over that cable is called an I/O channel. For clarity, only one I/O channel is considered herein, although those skilled in the art will readily recognize that most computers provide for a number of I/O channels, usually a power of two (e.g., 2, 4, 8, 16, 32, etc.). The cable corresponding to the I/O channel pictured is designated cable 23. The I/O channel depicted is bi-directional employing parallel transfers of one or two bytes.

Device A 14, DA 14, Device B 15, DB 15, and Device C 16, DC 16, communicate with IOU 12 via the I/O channel through Peripheral Subsystem 1 13, PS1 13, which multiplexes and demultiplexes I/O transfers from cable 23 to cables 24, 25 and 26. The I/O channel employs Externally Specified Indexing, ESI, as discussed above, which permits independent, asynchronous, buffered I/O transfers to transpire between IOU 12 and DA 14, DB 15 and DC 16 over the single I/O channel employing cable 23. The ESI employed by the single I/O channel is as taught by C. W. Ehrman, et al, in U.S. Pat. No. 3,243,781, but with a random access memory (RAM) used to store the individual Buffer Control Words (BCW's) corresponding to the independent, asynchronous buffered I/O transfers between IOU 12 and each of DA 14, DB 15 and DC 16 as discussed above. Also as explained earlier, the term I/O subchannel refers to the addressable location(s) within the RAM which contains the BCW(s) for I/O transfer between IOU 12 and a given device (e.g., DA 14, DB 15 or DC 16), along with any other hardware within IOU 12 dedicated to that function. Thus, it may be said that DA 14 communicates with IOU 12 via one I/O subchannel, DB 15 communicates with IOU 12 via a second I/O subchannel, and DC 16 communicates with IOU 12 a third I/O subchannel. Furthermore, these three subchannels share the single I/O channel employing cable 23.

Figure 2:
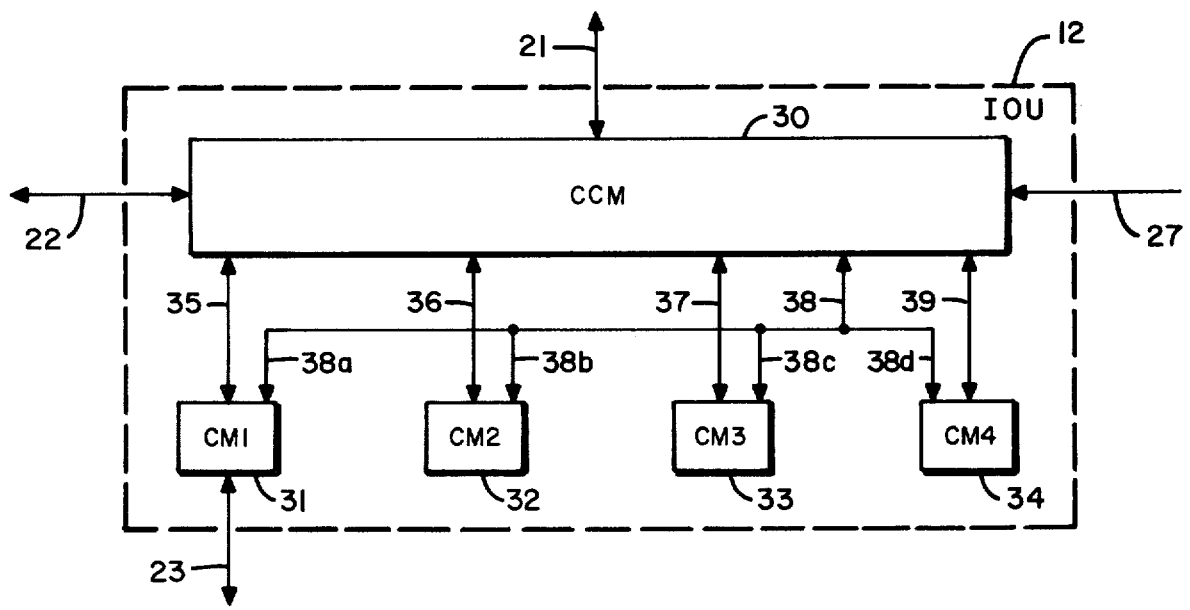
FIG. 2 shows the general organization of IOU 12.

FIG. 2 presents a more detailed view of IOU 12. Channel Control Module 30, CCM 30, provides the overall control and timing of IOU 12. CCM 30 also is the element of IOU 12 which is coupled to SSP 17 via cable 27, to MSU0 18 and MSU1 19 via cable 21, and to CPU 11 via cable 22. IOU 12 may contain a maximum of eight channel modules although only four Channel Modules (i.e., Channel Module 1 31, Channel Module 2 32, Channel Module 3 33, and Channel Module 4 34) are shown for clarity. Each Channel Module contains the hardware to interface cables for up to eight I/O channels. As explained above, only one I/O channel is illustrated for clarity. The single I/O channel illustrated employs cable 23 which is terminated by channel module number one, CM1 31.

Two cables couple each of the channel modules to CCM 30. The first such cable, cable 38, is a bi-directional data bus which permits transfers between CCM 30 and each of the channel modules (i.e., CM1 31, CM2 32, CM3 33, and CM4 34). Cable 38 contains the capacity for 38-bit parallel transfers which are made in the broadcast mode (i.e., all modules CCM 30, CM1 31, CM2 32, CM3 33 and CM4 34 receive the same information). Clearly the width of cable 38 may be other than 38 bits, but this width was chosen to permit transfers using a 36-bit word with two parity bits.

The second cable coupling each channel module to CCM 30 is a dedicated, control/status cable. As seen in FIG. 2, a separate dedicated control/status cable couples each channel module to CCM 30. Cable 35 is dedicated to CM1 31. Cable 36 is dedicated to CM2 32. Cable 37 is dedicated to CM3 33. Cable 39 is dedicated to CM4 34. Each dedicated control/status cable couples CCM 30 to the corresponding channel module for the transfer of control and status information. These dedicated cables are utilized, for example, to control use of and transfers along cable 38.

Figure 3:
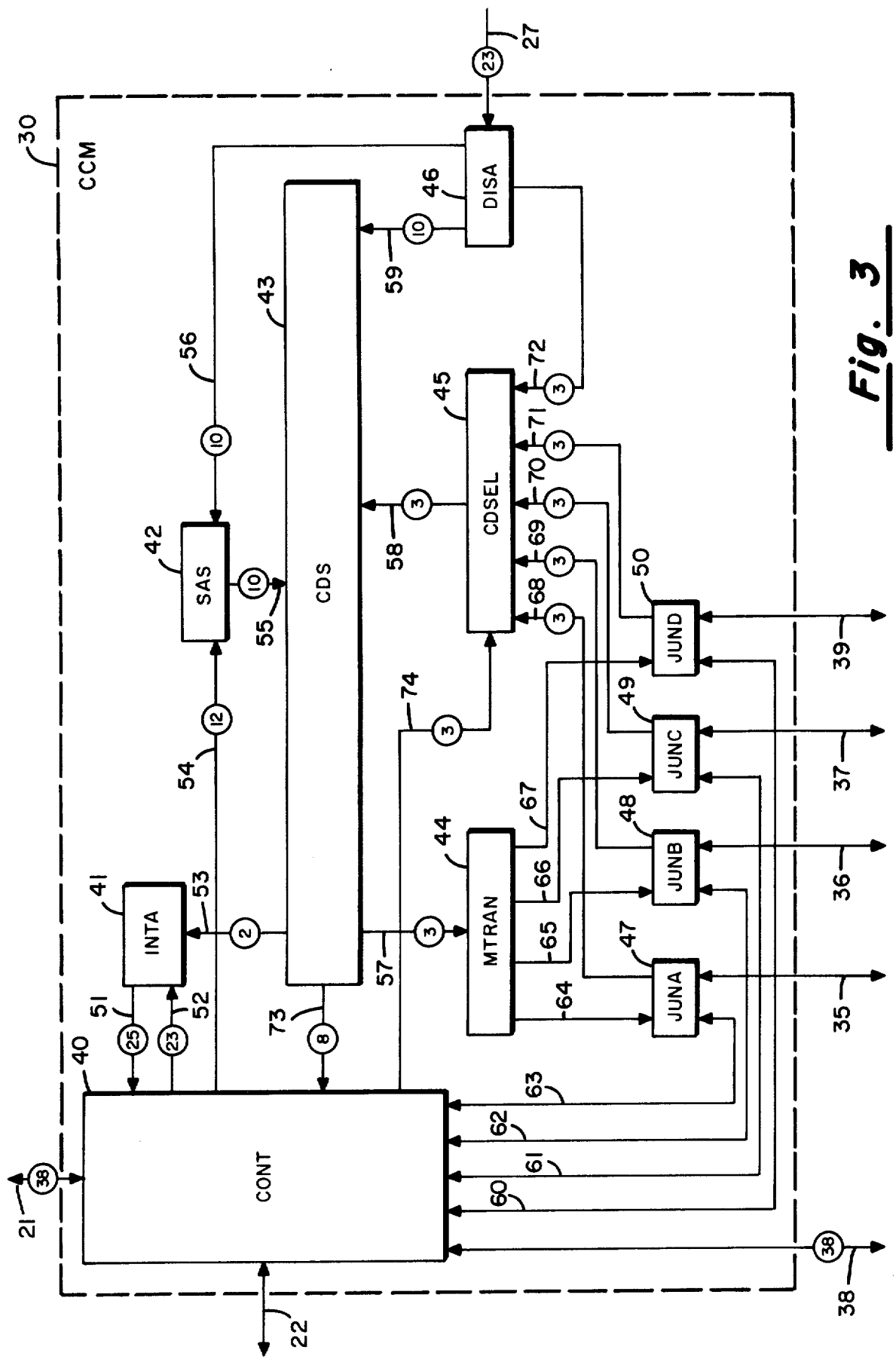
FIG. 3 shows a more detailed view of the IOU Channel Control Module, CCM 30, employing the present invention in its preferred embodiment.

FIG. 3 presents a more detailed view of CCM 30. Control 40, CONT 40, contains the logic used to provide overall control and timing for IOU 12. The construction of CONT 40 is considered common in the art. CONT 40 may utilize a microprogrammed architecture or may be implemented with special purpose logic. In the preferred embodiment, CONT 40 incorporates a special purpose logic design but microprogrammed architectures are also suitable to properly practice the present invention. CONT 40 is coupled to CPU 11 via cable 22 for the exchange of control and status information as previously explained. CONT 40 is also coupled to MSU0 18 and MSU1 19 via bidirectional cable 21. In the preferred embodiment, cable 21 has the capacity to transfer 38 parallel bits, though, readers skilled in the art will readily recognize that other widths may be used. The 38-bit, bi-directional data bus between CCM 30 and the channel modules is coupled to CONT 40 via cable 38.

The dedicated control/status cables (i.e., cable 35, cable 36, cable 37 and cable 39) from the four channel modules (i.e., CM1 31, CM2 32, CM3 33 and CM4 34) are coupled to Junction Point A 47 (JUNA 47), Junction Point B 48 (JUNB 48), Junction Point C 49 (JUNC 49) and Junction Point D 50 (JUND 50), respectively. Junctions, JUNA 47, JUNB 48, JUNC 49 and JUND 50, couple lines 63, 62, 61 and 60 to the dedicated control/status cables (i.e., cable 35, cable 36, cable 37 and cable 39, respectively). Lines 63, 62, 61 and 60 are provided to transfer those dedicated control/status signals between CONT 40 and the channel modules (via junctions, JUNA 47, JUNB 48, JUNC 49 and JUND 50, and the dedicated control/status cables 35, 36, 37 and 39) the use of which is considered known in the art. Junctions, JUNA 47, JUNB 48, JUNC 49 and JUND 50, also provide the means to couple the control lines 64, 65, 66 and 67 and the status lines 68, 69, 70 and 71 which are unique to the present invention to the dedicated control/status cables (i.e., cable 35, cable 36, cable 37 and cable 39) and hence to the channel modules.

CONT 40 can control independent, asynchronous, buffered I/O transfers on up to four I/O channels on each of eight channel modules in the preferred embodiment. CONT 40 can control independent, asynchronous, buffered I/O transfers, therefore, on a maximum of 32 I/O channels. Those skilled in the art will readily recognize the modifications required to CONT 40 to control a larger or smaller number of I/O channels. As explained earlier, only one I/O channel has been illustrated for clarity. CONT 40 has the capability to employ ESI on one or more of the 32 possible I/O channels. In the preferred embodiment, the IOU General Registers (IGR) has the capacity for handling a maximum of 1,023 subchannels. That is, the IGR has storage facilities and associated hardware for maintaining Buffer Control Words (BCW's) for independent asynchronous buffered I/O transfers for 1,023 separate peripheral devices (i.e., 1,023 I/O subchannels). It is the apparatus and method whereby these 1,023 I/O subchannels are allocated to the possible 32 I/O channels which is the present invention and which will be explained in detail.

The allocation of each I/O subchannel to the corresponding I/O channel, along with certain status information, is stored within Channel Descriptor Stack 43, CDS 43. In the preferred embodiment, CDS 43 is a random access memory (RAM) containing one addressable location for each of the 1,023 I/O subchannels. CDS 43 uses an I/O subchannel number as an address to reference the corresponding one of 1,023 addressable locations identifying the I/O channel to which the I/O subchannel has been allocated. Ten binary bits are required to uniquely address one of the 1,023 I/O subchannels (i.e., address the corresponding addressable location of CDS 43). These ten bits are called Address or ADR. The Stack Address Selector, SAS 42, transfers ADR to CDS 43 via line 55.

Figure 5:
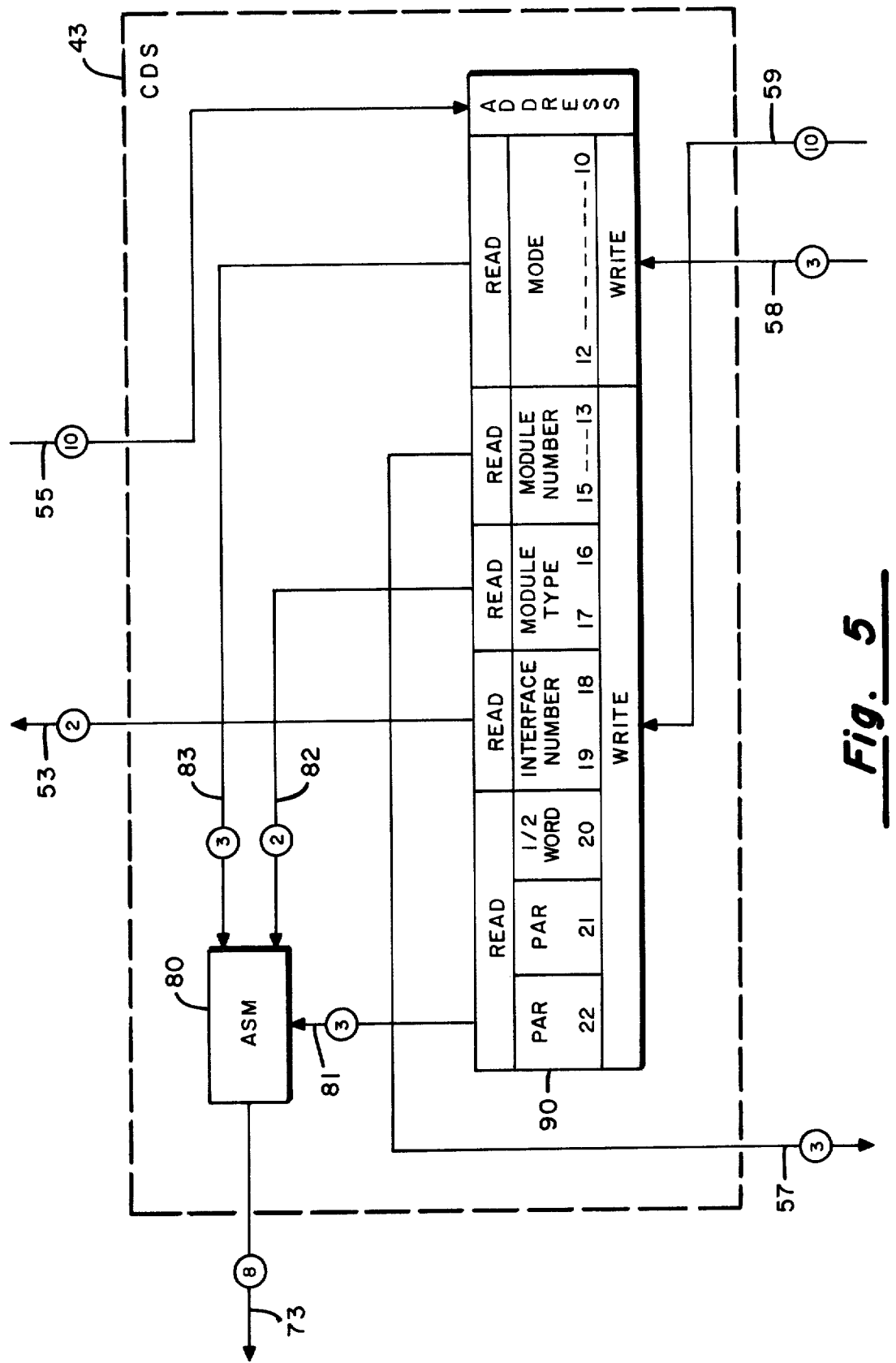
FIG. 5 shows the detailed operation of the Channel Descriptor Stack, CDS 43.

Each addressable location of CDS 43 has storage capacity for 13 binary bits. These 13 binary bit positions, along with the ten bits of ADR can be thought of as being a 23-bit allocation word. Table A defines the various fields within the 23-bit allocation word. Bits 0-9 (ADR) specify a unique one of the possible 1,023 I/O subchannels. Bits 10, 11 and 12 specify a status condition defined as MODE which is set to zero or idle state upon system initialization of the computer. Bits 13-15 together are called MODULE NUMBER. MODULE NUMBER identifies one of a possible eight channel modules. Bits 18 and 19 specify one of the four possible I/O channels within one channel module. Therefore, the combination of bits 13-15 and bits 18-19 specify one of the possible 32 I/O channels. Bits 16-17 define the module type. A given channel module may be configured for Internally Specified Indexing (ISI), Externally Specified Indexing (ESI), or block multiplexer modes of transfer. C. W. Ehrman, et al, define ISI and ESI in U.S. Pat. No. 3,243,781. It can be seen from Ehrman that ISI is an I/O transfer mode for which each I/O channel may have one and only one I/O subchannel. The block multiplexer mode is an industry standard I/O transfer protocol using no BCW's. Therefore, the present invention finds its application to I/O channels employing the ESI I/O transfer mode. Bit 20 specifies whether one or two byte transfers are used if the identified I/O subchannel is employing the ESI I/O transfer mode. Bits 21 and 22 are parity bits for internal error control. Bit 13-22 together may be termed the MODULE DESCRIPTOR. FIG. 5 shows CDS 43 in more detail. As described above, CDS 43 is addressed by the ten bits of ADR received via line 55. MODE (bits 10-12) is received as a three bit quantity via line 58. MODULE DESCRIPTOR (bits 13-22) is received as a ten bit quantity via line 59. MODULE NUMBER (bits 13-15) as read from CDS 43 is transferred as a three-bit quantity via line 57. INTERFACE NUMBER (bits 18 and 19) as read from CDS 43 is transferred as a two-bit quantity via line 53. MODE (bits 10-12), MODULE TYPE (bits 16-17), ½ WORD (bit 20), and the PARITY bits (i.e., bits 21 and 22) are transferred to TERMINAL D 80, via lines 83, 82 and 81, respectively. TERMINAL D 80 assembles these three fields into an eight-bit quantity which is transferred from CDS 43 via line 73.

Referring again to FIG. 3, CDS 43 receives a ten-bit address (ADR) from SAS 42 via line 55. MODE (bits 10-12) are transferred from Channel Descriptor Selector 45, CDSEL 45, via line 58 to CDS 43. TERMINAL B 46 transfers MODULE DESCRIPTOR (bits 13-22) to CDS 43 via line 59. INTERFACE NUMBER (bits 18 and 19) is transferred from CDS 43 to TERMINAL A 41, via line 53. MODULE NUMBER (bits 13-15) is transferred from CDS 43 to Module Translator 44, MTRAN 44, via line 57. MODE (bits 10-12), MODULE TYPE (bits 16 and 17), ½ WORD (bit 20), and the

TABLE A

| BIT POSITION | LOGICAL NAME | FUNCTION |
| --- | --- | --- |
| 0-9 | ADR | Identifies one of 1,023 I/O Subchannels |
| 10-12 | MODE | Specifies the current state of the subchannel. 0's → idle mode. |
| 13-15 | MODULE NUMBER | Identifies one of a possible eight channel modules. |
| 16-17 | MODULE TYPE | 00 → ISI subchannel<br>01 → ESI subchannel<br>10 → Block multiplexer subchannel<br>11 → Unassigned subchannel |
| 18-19 | INTERFACE NUMBER | Specifies one of four I/O channels within one channel modules. |
| 20 | ½ WORD | 0 → Byte transfer<br>1 → Two byte transfer |
| 21 | PAR | Odd Parity for Bits 13-22 |
| 22 | PAR | Odd Parity for Bits 10-12 |

PARITY bits (bits 21 and 22) are transferred as assembled by ASM 80 to CONT 40 via line 73.

Figure 4A:
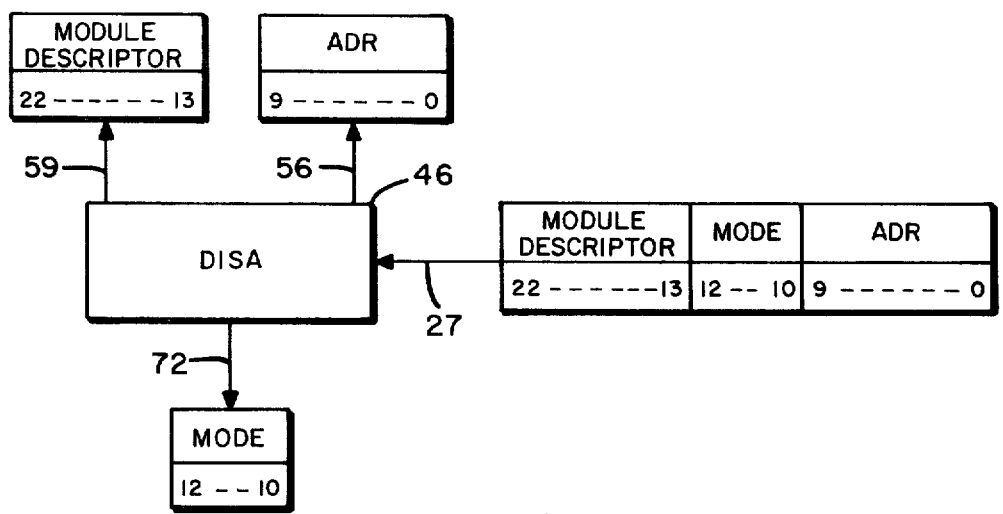
FIG. 4a shows the detailed operation of Disassembler, DISA 46.
Figure 4B:
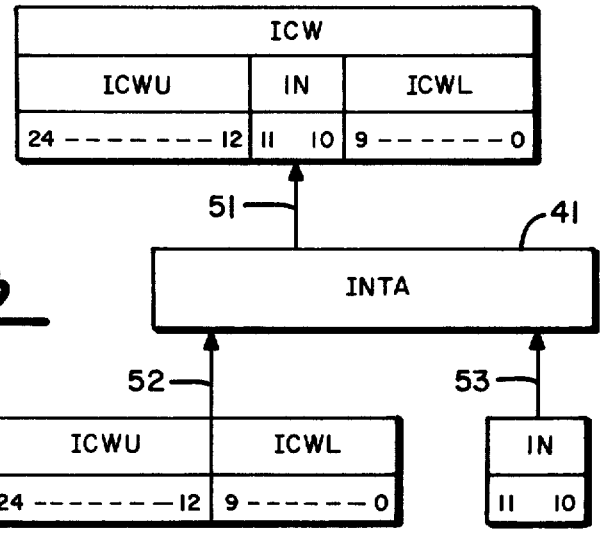
FIG. 4b shows the detailed operation of the Integrator, INTA 41.
Figure 4C:
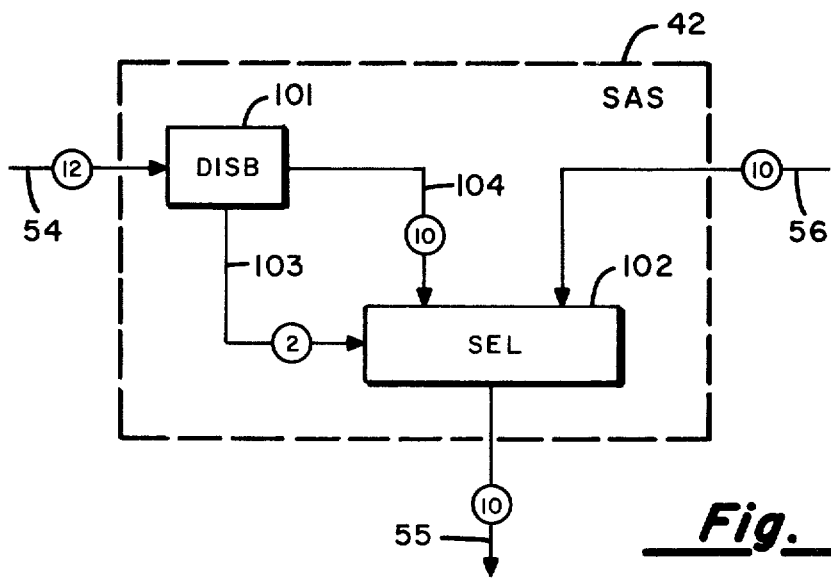
FIG. 4c shows the detailed operation of the Stack Address Selector, SAS 42.

CDS 43 receives the ten-bit address from SAS 42 which permits CDS 43 to access the one of the 1,023 addressable locations. SAS 42 simply selects which of its inputs, if any, is to provide the ten-bit address (ADR) for CDS 43 via line 55. The two inputs available to SAS 42 are ADR supplied from CONT 40 via line 54 and ADR supplied by SSP 17 via line 27 to TERMINAL B 46 and to SAS 42 via line 56. FIG. 4c provides a more detailed view of SAS 42. Line 54 actually contains 12 conductors. Ten of those conductors transfer the ten bits of ADR. The remaining two conductors are the control lines from CONT 40 which causes SAS 42 to select one or the other of its inputs. TERMINAL C 101, disassembles the 12 conductor line 54 into ADR and the two control lines. TERMINAL C 101 transfers the ten bits of ADR received via line 54 to Selector 102, SEL 102, via line 104. The two control lines received via line 54 are transferred to SEL 102 via line 103. The other input of SEL 102 is the ten bits of ADR received via line 56. SEL 102 may transfer, via line 55, ADR as received via line 104, ADR as received via line 56, or no ADR (i.e., all bits of ADR set to logical ones). SEL 102 selects the proper one of these three conditions based upon the logical states of the two conductors of line 103. The use of a selector such as SEL 102 is so common in the art, no further detail need be supplied herein.

CDS 43 is accessed to perform three basic functions. The first such function is system initialization which involves the loading of each addressable location of CDS 43 by SSP 17 with the I/O subchannel allocation information. The second function involves the reading of MODULE DESCRIPTOR from CDS 43 to permit CONT 40 to initiate an independent, asynchronous buffered I/O transfer using one of the I/O subchannels. The third function involves writing MODE into and reading MODE from CDS 43. MODE as mentioned before is an indication of I/O subchannel status. The use and handling of MODE is not considered new in the art. However, in the preferred embodiment of the present invention, MODE is stored within CDS 43. Therefore, a discussion of mode is included herein.

During system initialization, SSP 17 loads each of the addressable locations of CDS 43 with bits 10-22 of the I/O subchannel allocation information.

Referring to FIG. 3, SSP 17 transfers the 23-bit I/O subchannel allocation information to TERMINAL B 46, via line 27. TERMINAL B 46 disassembles the 23-bit quantity into a three-bit quantity and two ten-bit quantities. On FIG. 4a, it is shown that ADR (bits 0-9) is transferred by TERMINAL B 46 via line 56. MODULE DESCRIPTOR (i.e., bits 13-22) is transferred via line 59. MODE (i.e., bits 10-12) is transferred via line 72. As stated in Table A, SSP 17 transfers MODE (i.e., bits 10-12) equal to zero (i.e., bits 10, 11 and 12 all equal zero) to signify inactivity on the corresponding I/O subchannel. Referring again to FIG. 3, TERMINAL B 46 transfers ADR (bits 0-9) to SAS 42 via line 56. TERMINAL B 46 transfers MODE (bits 10-12) to the Channel Descriptor Selector, CDSEL 45, via line 72. DISA 46 transfers MODULE DESCRIPTOR (bits 13-22) to the Channel Descriptor Stack, CDS 43, via line 59.

Figure 6A:
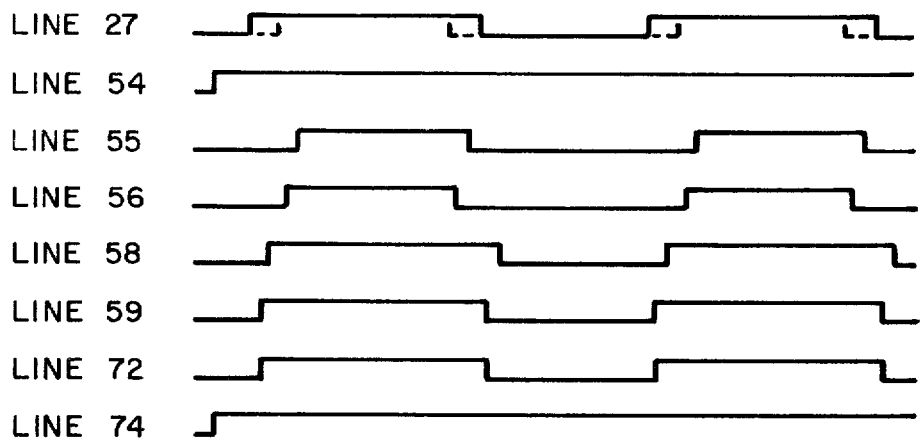
FIG. 6a shows the timing of CCM 30 during system initiation.

FIG. 6a shows the timing of all relevant signals during system initialization by SSP 17. Line 27 is shown as only transferring two 23-bit allocation words (i.e., sufficient I/O subchannel allocation information to allocate two of the possible 1,023 I/O subchannels). The timing of the remaining transfers is identical. MODE (bits 10-12) and MODULE DESCRIPTOR (bits 13-22) are present on line 27 at the time corresponding to the solid indications. ADR (bits 0-9) is present on line 27 for a shorter time corresponding to the dashed indications. The timing of the transfers of ADR (bits 0-9) via line 56, of MODE (bits 10-12) via line 72, and of MODULE DESCRIPTOR (bits 13-22) via line 59 are also shown in FIG. 6a.

As explained earlier SAS 42 selects ADR from CONT 40 via line 54 or ADR from TERMINAL B 46 via line 56 on the basis of the binary states of the two conductors of line 103. See also FIG. 4c. To perform system initialization, the states of the two conductors of line 103 must cause SEL 102 to transfer ADR as received via line 56 to CDS 43 via line 55. The timing of line 54 on FIG. 6a represents the enabling of this selection and transfer. Therefore, each value of ADR received via line 56 is transferred to CDS 43 via line 55 to enable CDS 43 to select the one addressable location of CDS 43 for which SSP 17 is supplying I/O subchannel allocation information. The transfer of ADR on line 27 is shown as of a shorter duration than the transfer of the remainder of the I/O subchannel allocation information to ensure that MODE and MODULE DESCRIPTOR are present at CDS 43 while CDS 43 is accessing the one addressable location corresponding to ADR.

MODE is transferred by TERMINAL B 46 via line 72. See FIG. 4a. CDSEL 45 receives MODE via line 72. See FIG. 3. CDSEL 45 is a selector similar to SEL 102. CDSEL 45, however, has five inputs of three bits each (i.e., line 68, line 69, line 70, line 71 and line 72), a three-bit output (i.e., line 58), and a three-bit control line (i.e., line 74). Based upon the binary states of the three conductors of line 74, CDSEL 45 selects one (or none) of the five inputs of three bits for transfer as its three-bit output via line 58. Again, this technique is quite common in the art, so extensive explanation is not attempted here. FIG. 6a, however, shows the selection by line 74 of MODE received from TERMINAL B 46 via line 72 as the output of CDSEL 45 via line 58. As with the selection of SAS 42 via line 54, line 74 selects MODE received via line 72 during the entire system initialization process.

A review of FIG. 5 in conjunction with FIG. 6a will illustrate the system initialization process as accomplishing the loading of each addressable location of CDS 43 with MODE and MODULE DESCRIPTOR.

Figure 6B:
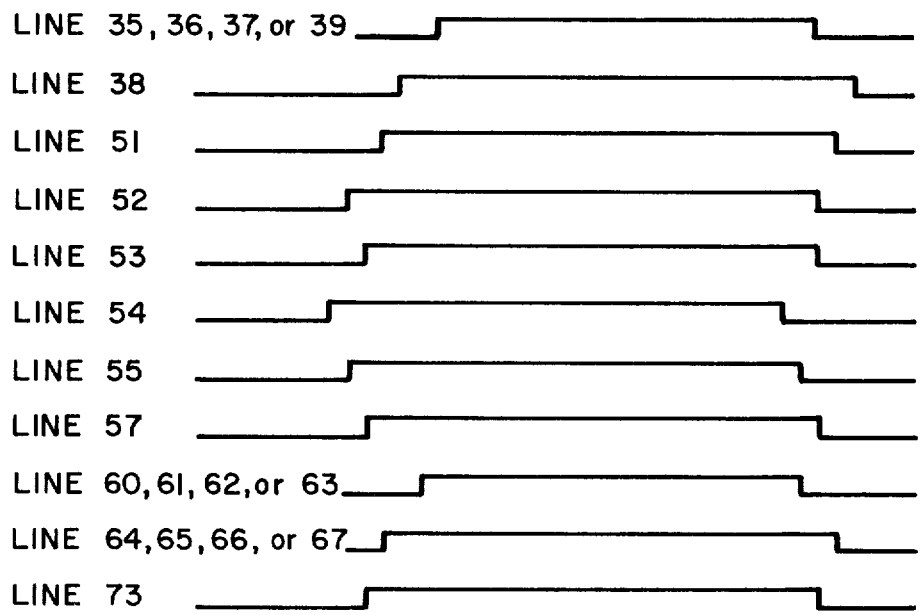
FIG. 6b shows the timing of CCM 30 during I/O buffer initiation.

The second function of the present invention involves the reading of MODULE DESCRIPTOR from CDS 43 to permit CONT 40 to initiate an independent, asynchronous buffered I/O transfer using one of the I/O subchannels. This occurs when CONT 40 receives a command to initiate an independent, asynchronous, buffered I/O transfer wherein the command is under software control. CONT 40 may receive the command directly from CPU 11 via line 22 or CONT 40 may receive the command from MSU0 18 or MSU1 19 via line 21. Both methods are commonly used in the art and either may work with the present invention. The important factor is that the command need not specify an I/O channel but need only specify an I/O subchannel. Again this is common in the art, but, for the present invention, CONT 40 must access CDS 43 to determine to which I/O channel the I/O subchannel specified in the command has been allocated. To access CDS 43, CONT 40 removes the I/O subchannel number from the command and transfers it as a ten-bit address (ADR) to SAS 42 via line 54. See FIG. 3. Simultaneously, CONT 40 sets the binary state of the two control line conductors of line 54 to cause SEL 102 to select ADR from line 104 for transfer to CDS 43 via line 55. See also FIG. 4c. Referring again to FIG. 5, CDS 43 receives ADR via line 55 and accesses the corresponding addressable location. The contents of the addressable location are read. INTERFACE NUMBER (bits 18 and 19) is transferred as a two-bit quantity via line 53. MODULE NUMBER (bits 13–15) is transferred as a three-bit quantity via line 57. MODE (bits 10–12), MODULE TYPE (bits 16 and 17), ½ WORD (bit 20), and the PARITY bits (bits 21 and 22) are transferred to ASM 80 via lines 83, 82 and 81, respectively. ASM 80 assembles these fields into an eight-bit quantity which it transfers via line 73. The timing of such a read access to CDS 43 is shown in FIG. 6b which illustrates the relative timing of all relevant signals.

To initiate an independent, asynchronous, buffered I/O transfer, CONT 40 must notify the appropriate channel module. To do so, CONT 40 prepares an initiate command word (of 25 bits in the preferred embodiment), transfers this initiate command word in broadcast-fashion to all channel modules via line 38, and ensures that the proper channel module is notified that it must act upon the initiate command word being transferred via line 38. See FIG. 3. CONT 40 receives from CDS 43 via line 73 an eight-bit quantity containing MODE, MODULE TYPE, ½ WORD, and PARITY bits. CDS 43 utilizes this eight-bit quantity to produce an Initiate Control Word Lower (ICWL) and an Initiate Control Word Upper (ICWU). The methods of composition of ICWL and ICWU are considered common in the art and unrelated to the operation of the present invention. Therefore, ICWL and ICWU will not be discussed in detail. The initiate command word must also contain INTERFACE NUMBER. As explained in Table A, INTERFACE NUMBER specifies one of four possible I/O channels within a given channel module. The integrator, TERMINAL A 41, receives INTERFACE NUMBER from CDS 43 via line 53. TERMINAL A 41 receives the other 23 bits of the initiate command word from CONT 40 via line 52. TERMINAL A 41 integrates these two quantities to produce an initiate command word which is transferred to CONT 40 via line 51. FIG. 4b shows the function of INTA 41. Initiate Command Word Lower (ICWL) and Initiate Command Word Upper (ICWU) are received as a 23-bit quantity via line 52. INTERFACE NUMBER is received as a two-bit quantity via line 53. TERMINAL A 41 integrates these and transfers a complete Initiate Command Word (ICW) as a 25-bit quantity via line 51. See FIG. 6b to view the timing of the generation of the initiate command word. CONT 40 transfers the complete initiate command word to all channel modules via cable 38.

To complete the initiation of an independent, asynchronous, buffered I/O transfer, the appropriate channel module must be notified that an initiate command word is being transferred via cable 38. Referring to FIG. 5, MODULE NUMBER (bits 13–15) is read from CDS 43 and transferred as a three-bit quantity via line 57. MODULE NUMBER is received by Module Translator 44, MTRAN 44, via line 57. See FIG. 3. MTRAN 44 translates the three-bit MODULE NUMBER into a signal to be sent over one of eight (only four shown) lines (i.e., line 64, 65, 66 or 67) to notify one of the channel modules to respond to the initiate command word being transferred via cable 38. The lines 64, 65, 66 and 67 actually terminate at junctions, JUNA 47, JUNB 48, JUNC 49 and JUND 50, respectively, which combine lines 64, 65, 66 and 67 with lines 60, 61, 62 and 63, respectively, for transfer of control/status signals to the channel modules via cables 35, 36, 37 and 39, respectively. The signals which are transferred via lines 60, 61, 62 and 63 are outside the scope of the present discussion as they are not pertinent to the present invention. FIG. 6b shows the timing of the signals which notify the proper channel module to respond to the initiate command word being transferred via cable 38.

Figure 6C:
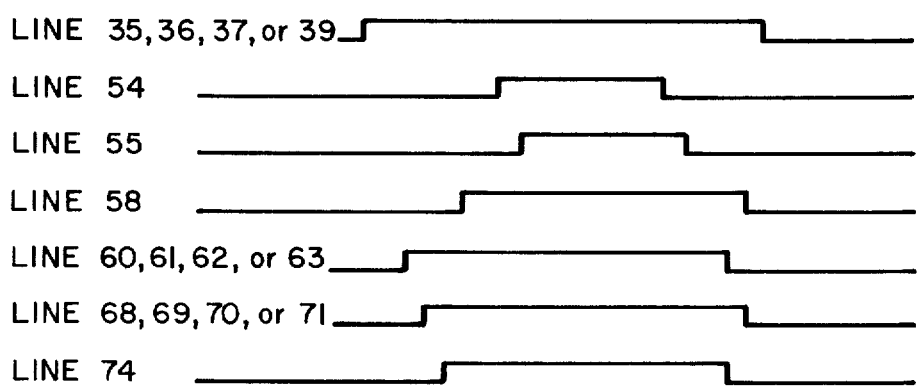
FIG. 6c shows the timing of CCM 30 during a change to the MODE field of CDS 43.

The third function of the present invention to be discussed involves writing MODE into and reading MODE from CDS 43. As mentioned earlier, this function is described for completeness of the preferred embodiment only as the use of an I/O subchannel status indication such as MODE is common in the art. The writing of mode is accomplished by CONT 40 transferring ADR to SAS 42 via line 54 and setting the control lines of line 54 to cause SEL 102 to transfer ADR as received via line 104 to CDS 43 via line 55. See FIG. 4c. CDS 43 upon receipt of ADR via line 55 accesses the addressable location corresponding to ADR. FIG. 6c shows the timing of the signals causing access to the appropriate addressable location of CDS 43. CONT 40 transfers a three-bit quantity to CDSEL 45 via line 74 causing CDSEL 45 to select the one three-bit input desired. See FIG. 3. For a change of mode, one of lines 68, 69, 70 or 71 will be selected. MODE is transferred from each channel module via the corresponding control/status cable (i.e., cable 35, cable 36, cable 37 or cable 39) to the corresponding junction (i.e., JUNA 47, JUNB 48, JUNC 49 or JUND 50). Each junction transfers MODE to CDSEL 45 as a three-bit quantity via the corresponding one of lines 68, 69, 70 or 71. Upon selection of CDSEL 45 based upon the binary states of the three conductors of line 74, CDSEL 45 transfers the select value of MODE to CDS 43 via line 58 for storage at the addressable location being addressed by SAS 42 via line 55. The reading of mode has already been discussed as a portion of the generation of the initiate command word. FIG. 6c shows the timing of signals associated with storing a new value of MODE.

What is claimed is:

1. In a computer with means for initializing the operation of said computer and with an Input/Output unit having a plurality of Input/Output channels wherein one or more of said Input/Output channels is each capable of maintaining a plurality of independent asynchronous buffered Input/Output transfers and having a controller capable of controlling said plurality of asynchronous buffer Input/Output transfers through the use of a plurality of Input/Output subchannels wherein each of said plurality of independent asynchronous buffered Input/Output transfers is controlled through the use of a different one of said plurality of Input/Output subchannels, the improved apparatus for allocating each of said plurality of Input/Output subchannels to one of said plurality of Input/Output channels and for conducting buffered Input/Output transfers operative in accordance with Externally Specified Indexing (ESI), an improvement to such apparatus according that each of a plurality of Input/Output subchannels—each said Input/Output subchannels being a designation of the hardware resource, specifically the Buffer Control Words (BCWs) contained within I/O General Register (IGR), which designated resource is dedicated to the control of communication upon an Input/Output channel with a corresponding one of a plurality of peripheral devices which share said Input/Output channel—are allocable, meaning assignable, to each of a plurality of Input/Output channels—each said Input/Output channel being a bandwidth limited physical communication path between said Input/Output apparatus and a multiplicity of peripheral devices,—said inprovement comprising:

random access memory means, called a Channel Descriptor Stack (CDS), for storing an allocation of each of said plurality of Input/Output channels to a one of said plurality on Input/Output subchannels, wherein said storing means has a one addressable location corresponding to each of said plurality of Input/Output subchannels:

loading means, called a System Support Processor (SPS), for entering said allocation of each of said plurality of Input/Output channels to said one of said plurality of Input/Output subchannels into said storing means; and control means responsively coupled to said storing means for causing each of said buffered Input/Output transfers as occur upon each of said plurality of Input/Output subchannels to physically transpire upon said allocated one of said plurality of Input/Output channels;

whereby said hardware resource associated with each said Input/Output subchannels, which resource is dedicated to the control of communication upon an Input/Output channel, is allocated, meaning distributed, in accordance with said stored allocation to a one of said bandwidth limited physical I/O channel communication paths;

whereby the designation of hardware resource within an Input/Output apparatus operative in accordance with Externally Specified Indexing is allocated, meaning distributed, to ones of bandwidth limited physical I/O channel communication paths in accordance with stores within a random access memory means for storing.

2. A computer according to claim 1 wherein the storing means further comprises:

a random access memory having one addressable location corresponding to each of said plurality of Input/Output subchannels.

* * * * *